United States Patent [19]

Curran

[11] 4,410,250
[45] Oct. 18, 1983

[54] FLASH ADAPATER AND SYSTEM

[75] Inventor: Kenneth J. Curran, Thousand Oaks, Calif.

[73] Assignee: Vivitar Corporation, Santa Monica, Calif.

[21] Appl. No.: 250,684

[22] Filed: Apr. 3, 1981

[51] Int. Cl.³ .............................................. G03B 15/05
[52] U.S. Cl. ..................................... 354/33; 354/128; 354/35; 354/141; 354/145
[58] Field of Search ........................... 354/27, 32–35, 354/59, 60 F, 127, 128, 126, 141, 145, 289, 42, 49, 36; 235/64.7; 315/151, 159, 133–136, 241 P; 250/216; 356/225, 234, 235; 362/4, 5

[56] References Cited

U.S. PATENT DOCUMENTS

| | | | |
|---|---|---|---|
| 3,481,258 | 12/1969 | Mori et al. | 354/36 |
| 3,545,870 | 12/1970 | Burgarella | 354/59 X |
| 3,568,582 | 3/1971 | Uchida et al. | 354/60 F X |
| 3,614,918 | 10/1971 | Hennig et al. | 95/10 |
| 3,769,888 | 11/1973 | Quinn | 95/10 |
| 3,846,806 | 11/1974 | Yata et al. | 354/31 |
| 4,021,824 | 5/1977 | Uchiyama et al. | 354/33 |
| 4,047,194 | 9/1977 | Nakamura et al. | 354/149 |
| 4,078,242 | 3/1978 | Uchiyama et al. | 354/139 |
| 4,079,385 | 3/1978 | Nakamura et al. | 354/23 |
| 4,091,396 | 5/1978 | Sahara et al. | 354/23 |
| 4,095,242 | 6/1978 | Tsunekawa | 354/33 |
| 4,164,686 | 8/1979 | Vital et al. | 315/241 P |
| 4,201,934 | 5/1980 | Esaki | 315/151 |
| 4,222,647 | 9/1980 | Kawarada et al. | 354/145 |
| 4,230,402 | 10/1980 | Uchiyama et al. | 354/33 |
| 4,295,717 | 10/1981 | Kitagawa et al. | 354/128 X |
| 4,315,679 | 2/1982 | Nakamura | 354/60 F |

FOREIGN PATENT DOCUMENTS 1930971 6/1979 Fed. Rep. of Germany .
2043949 10/1980 United Kingdom ................ 354/145

OTHER PUBLICATIONS

Sunpak Brochure entitled "SUNPAK Creators of Light for Creative Photography" (undated).

*Primary Examiner*—William B. Perkey
*Attorney, Agent, or Firm*—Lyon & Lyon

[57] ABSTRACT

Disclosed herein is a flash adapter system and a plurality of flash adapters thereof having substantial common mechanical and electrical components. Each adapter of the system includes an adaptive circuit module and a sensor circuit providing an input to the adaptive circuit module which may represent light falling upon the adapter. Each adapter may further include innerface circuitry to adapt each adapter to specific and unique camera signals associated with various automatic cameras. A sensitivity adjustment mechanism adjusts the sensitivity of a photosensor in accordance with at least one parameter and may further be adapted to serve as a calculator which relates film sensitivity and camera aperture.

18 Claims, 12 Drawing Figures

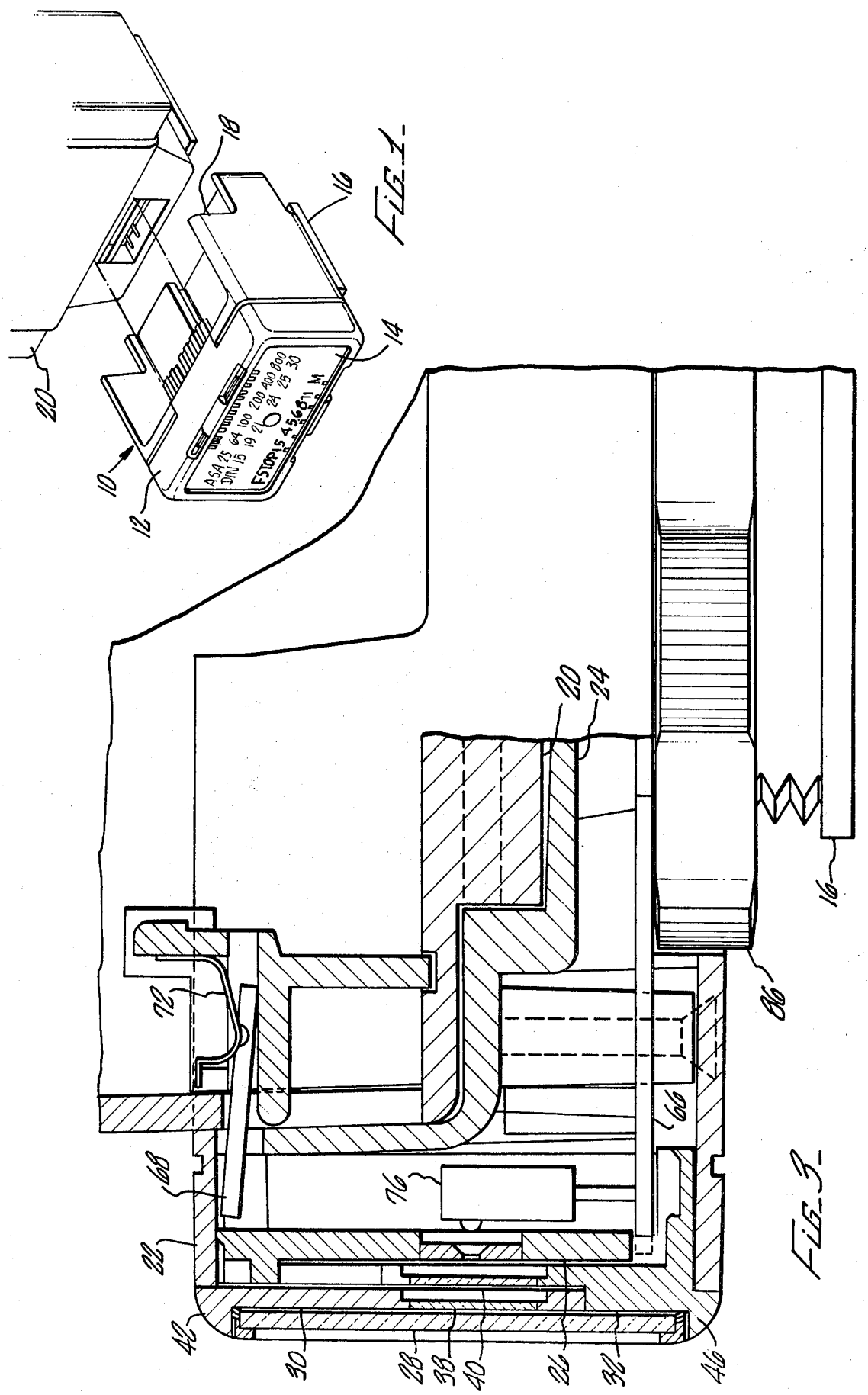

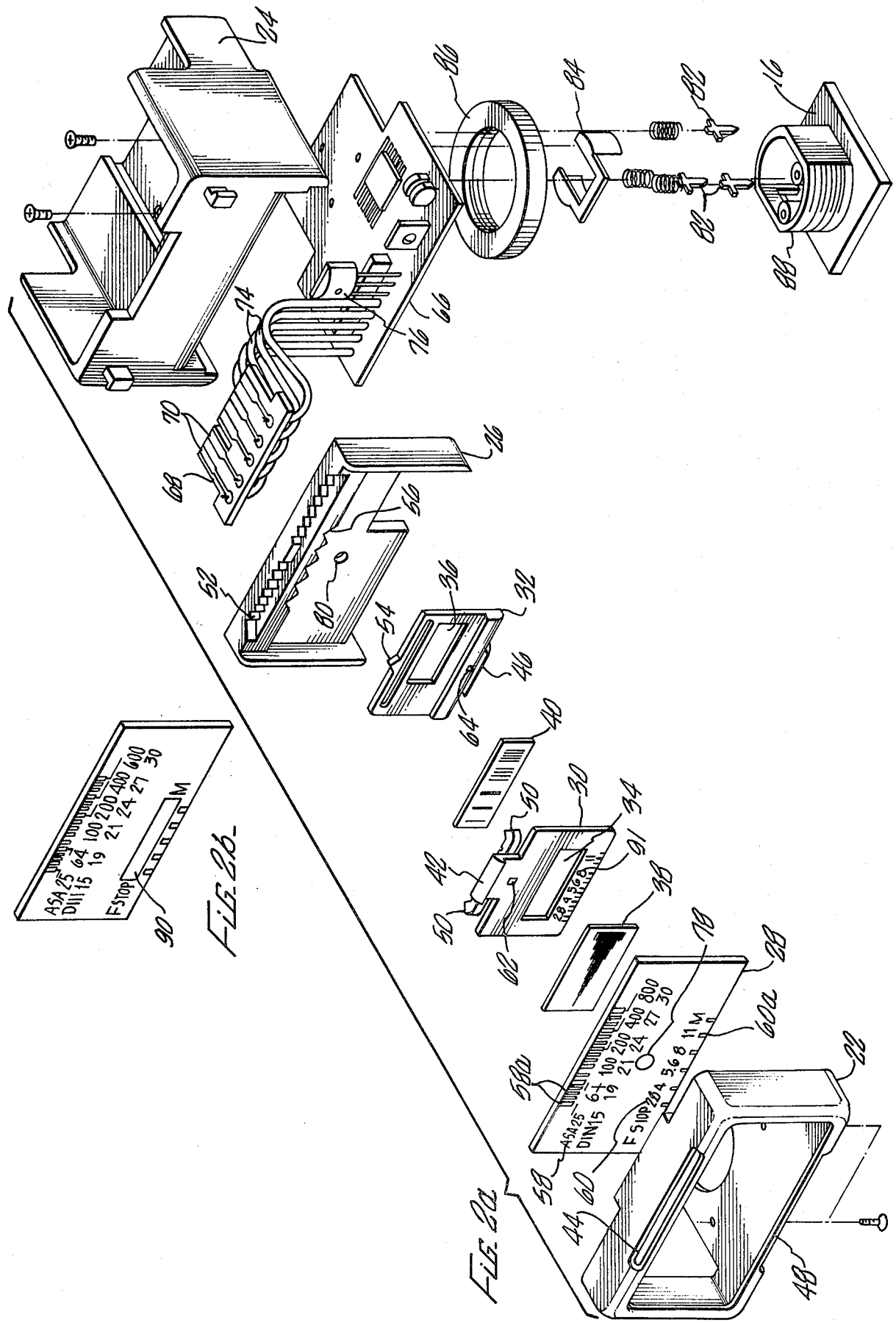

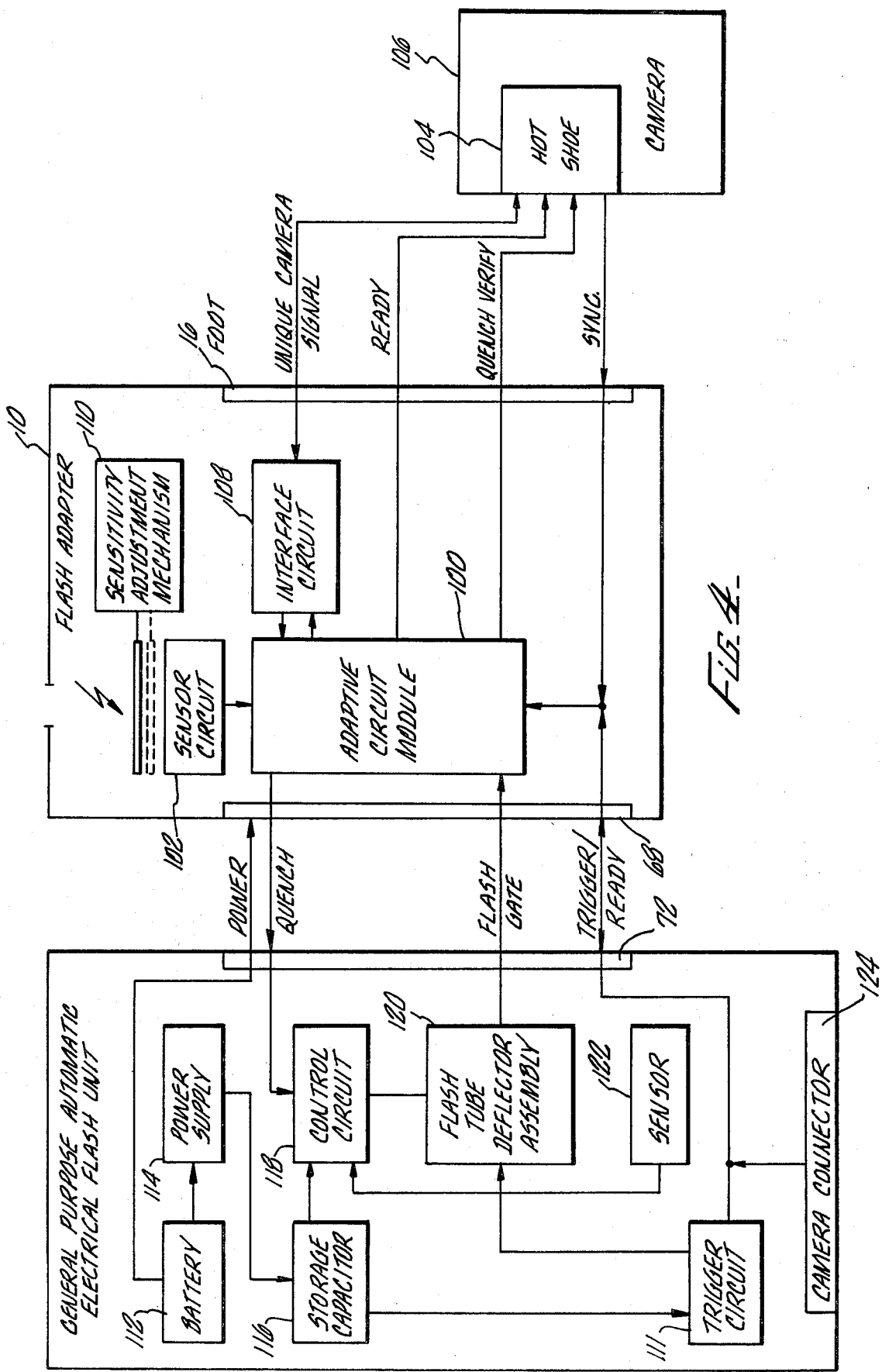

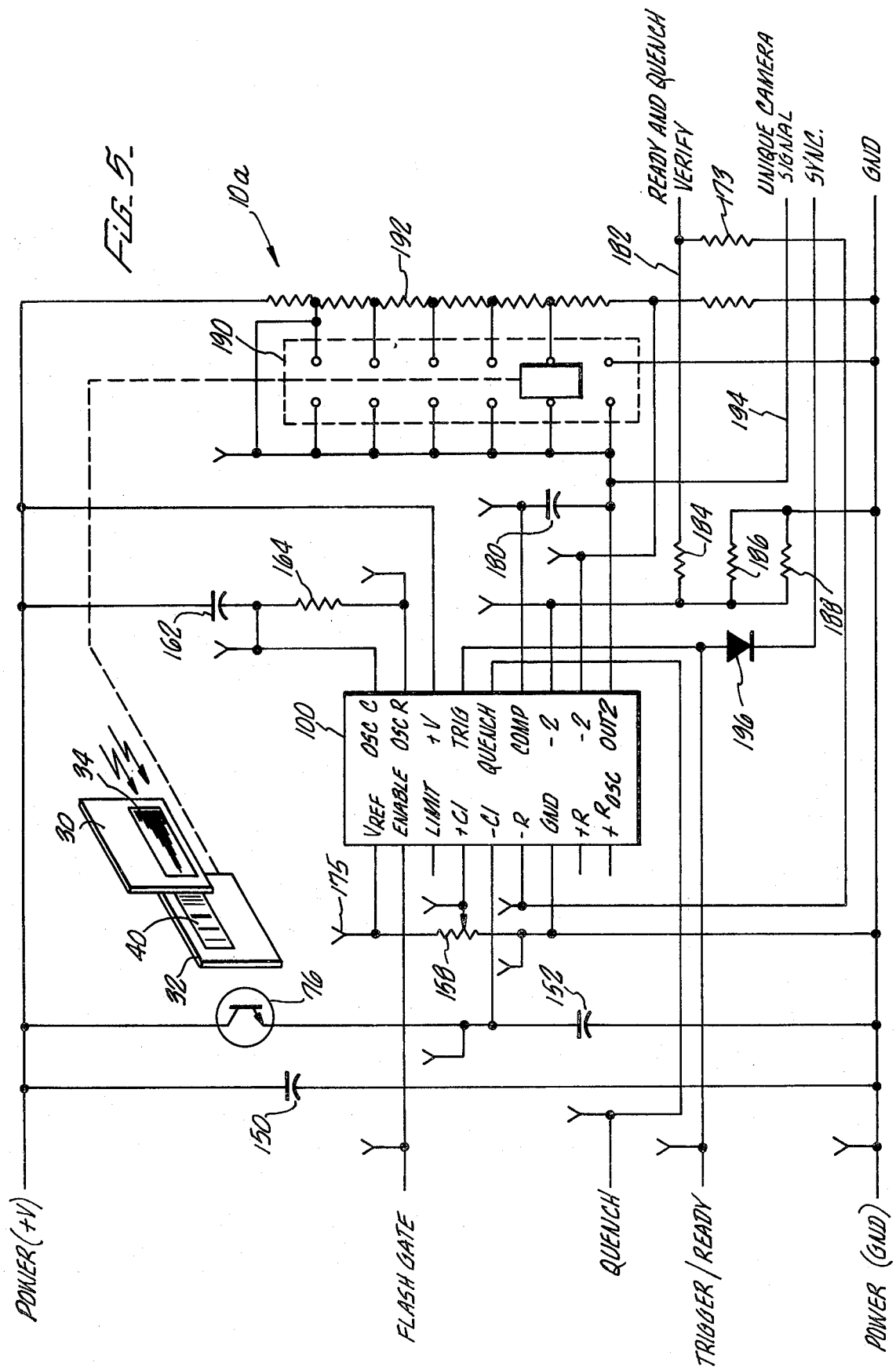

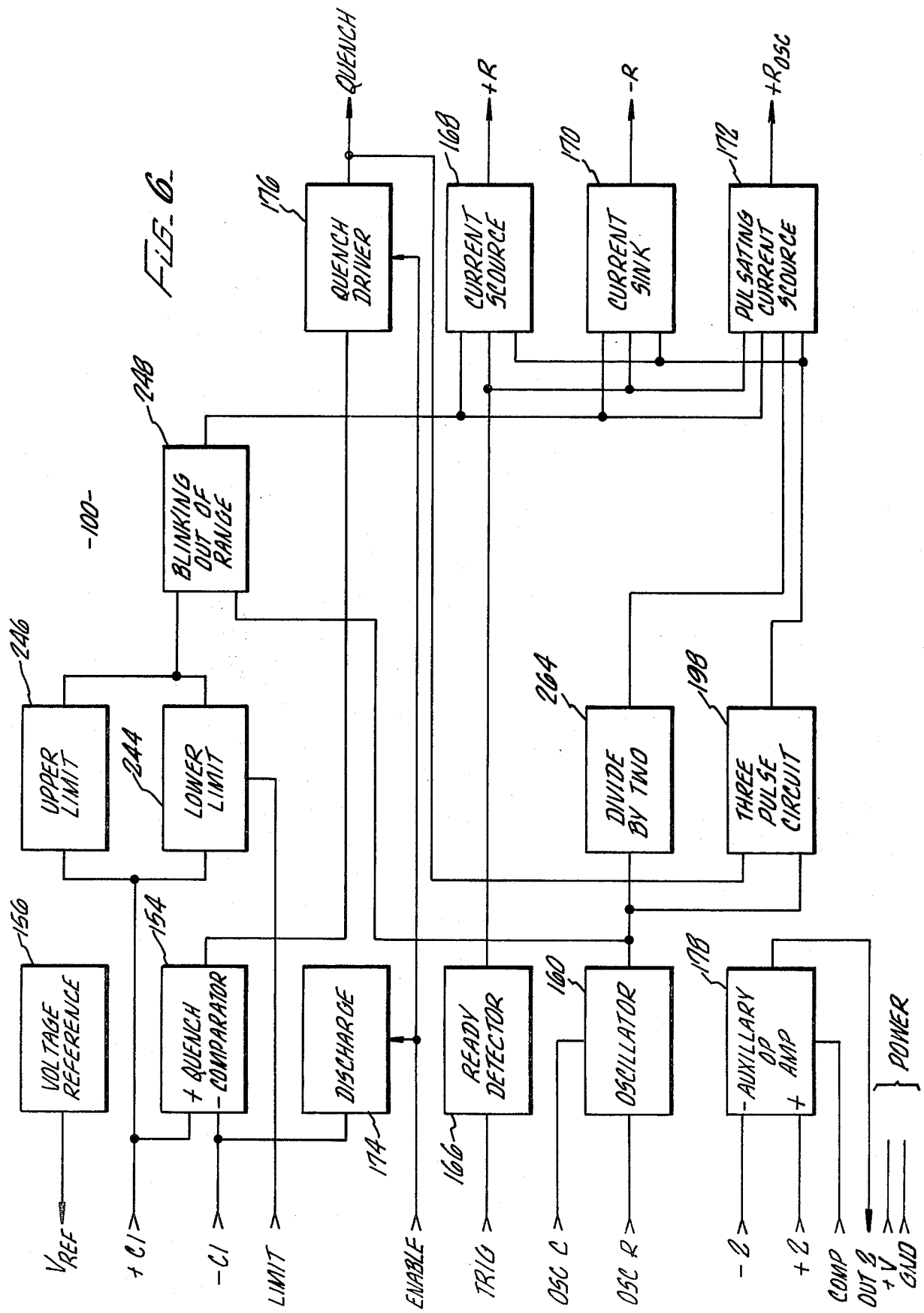

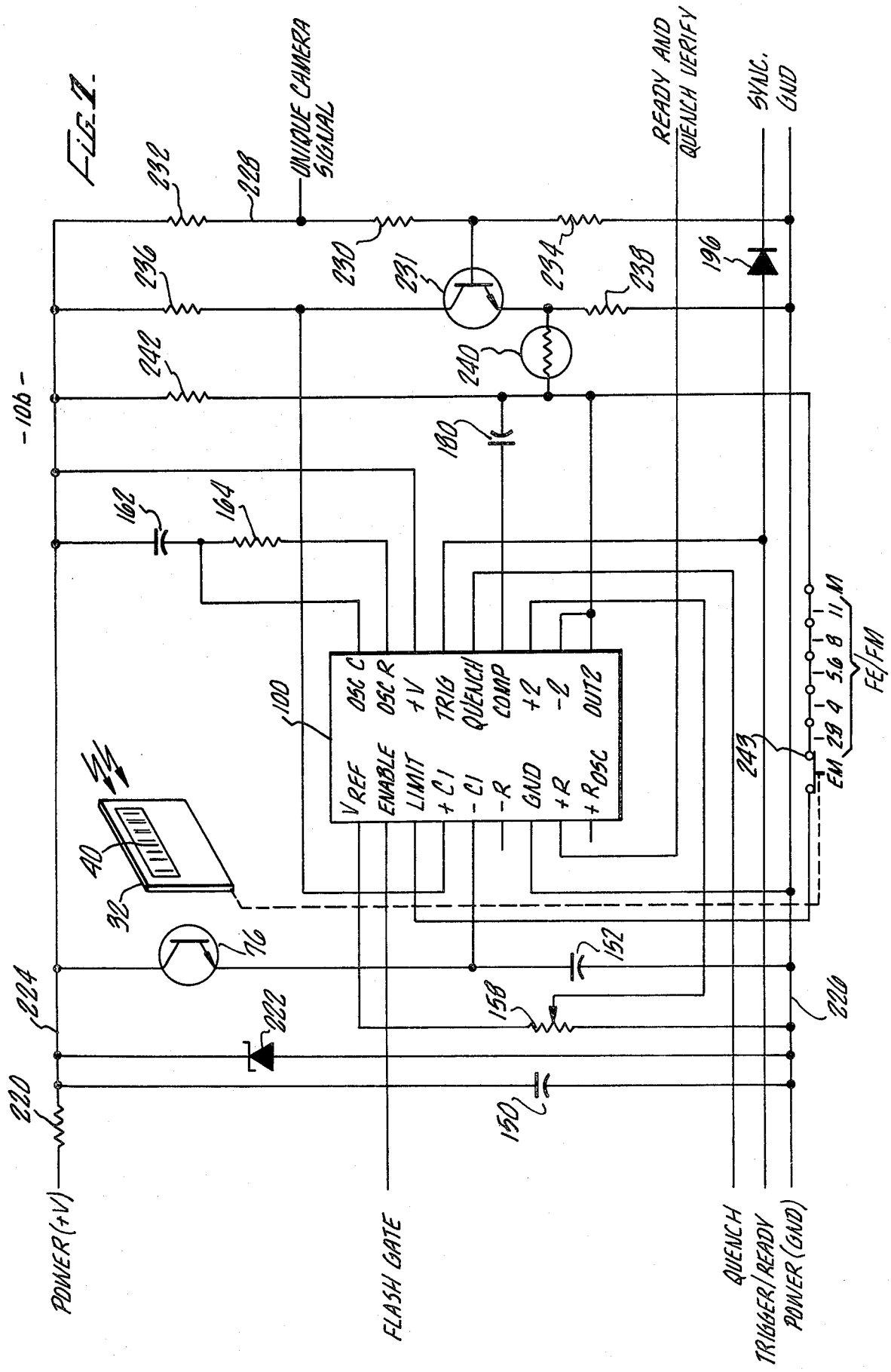

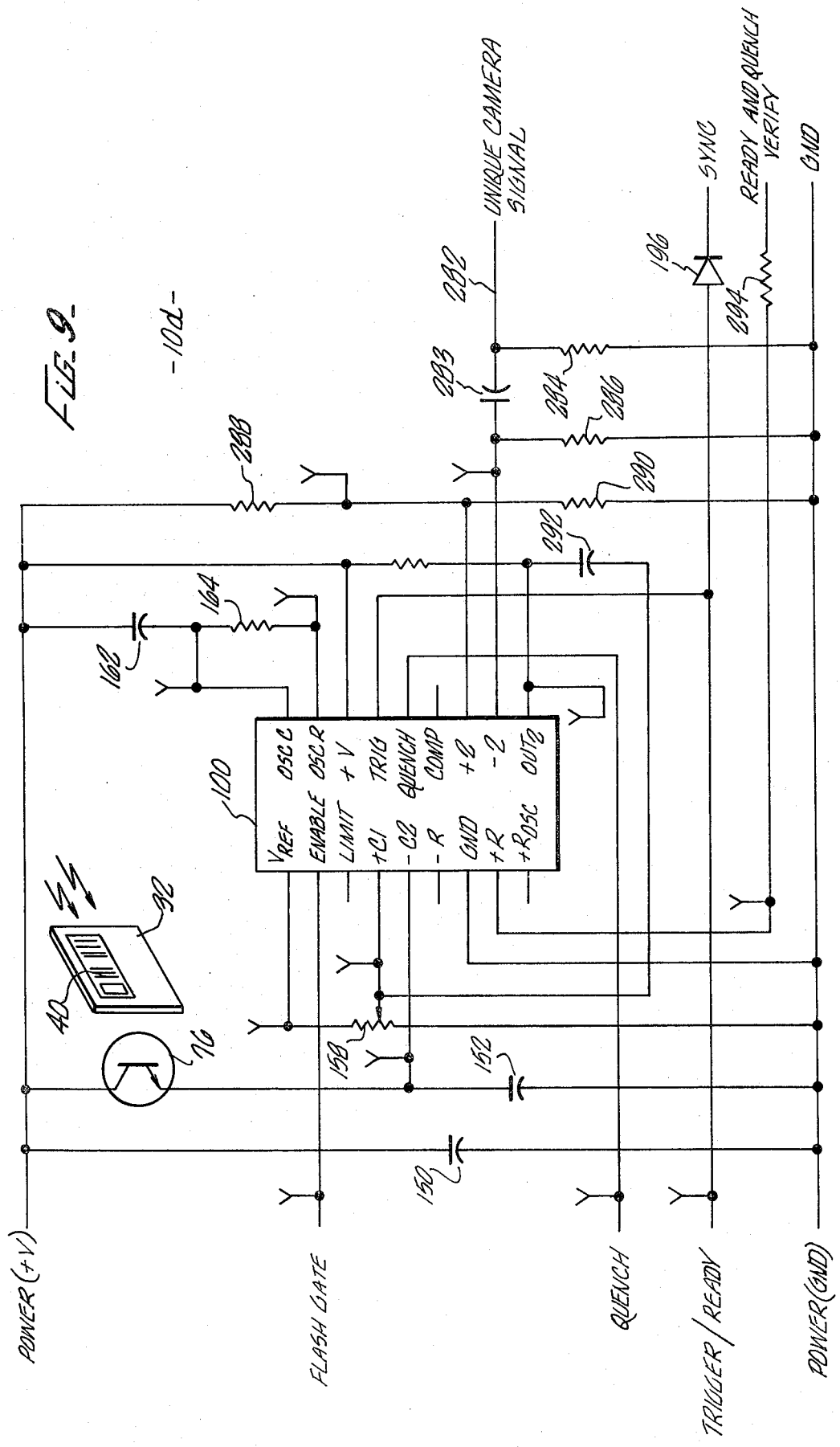

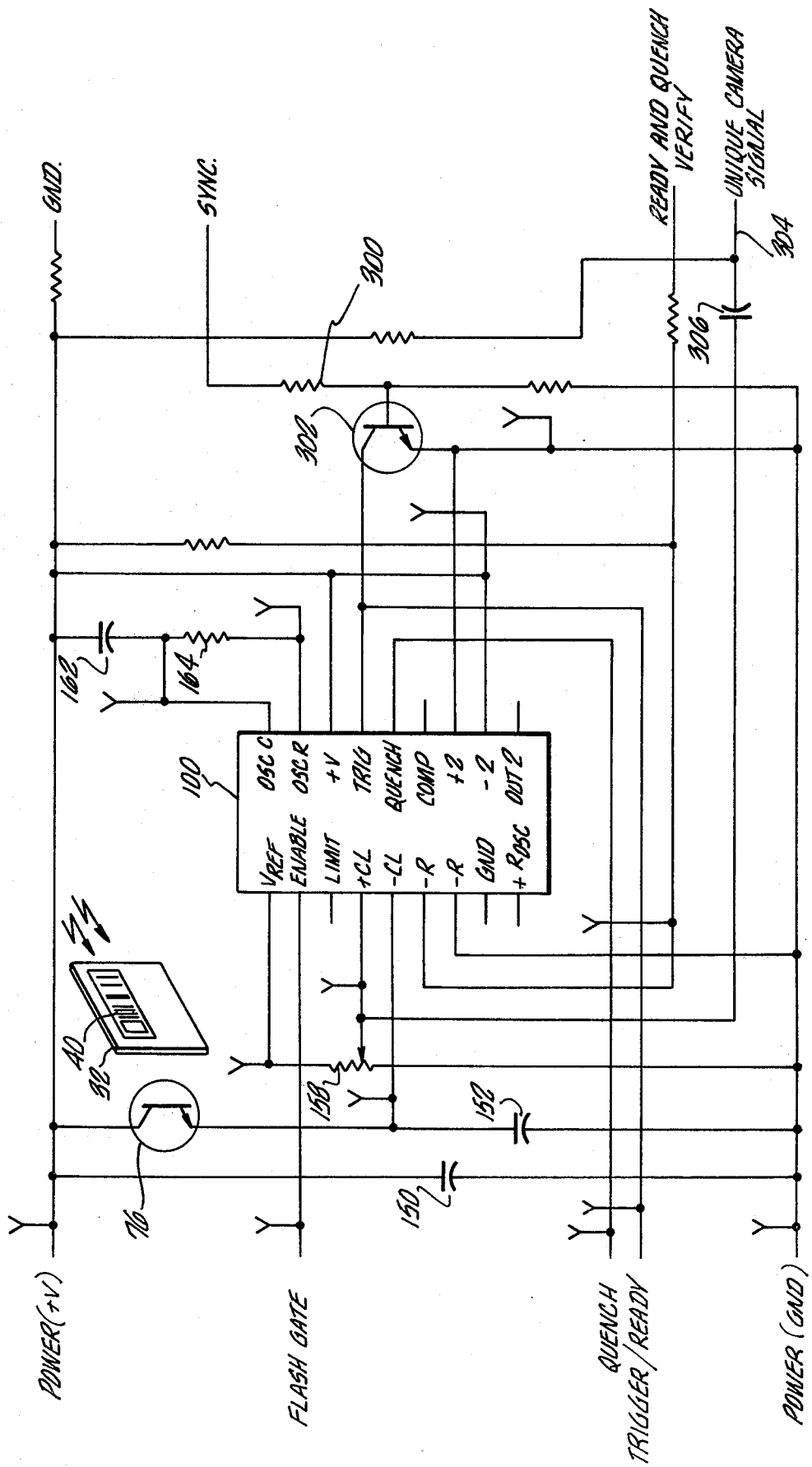

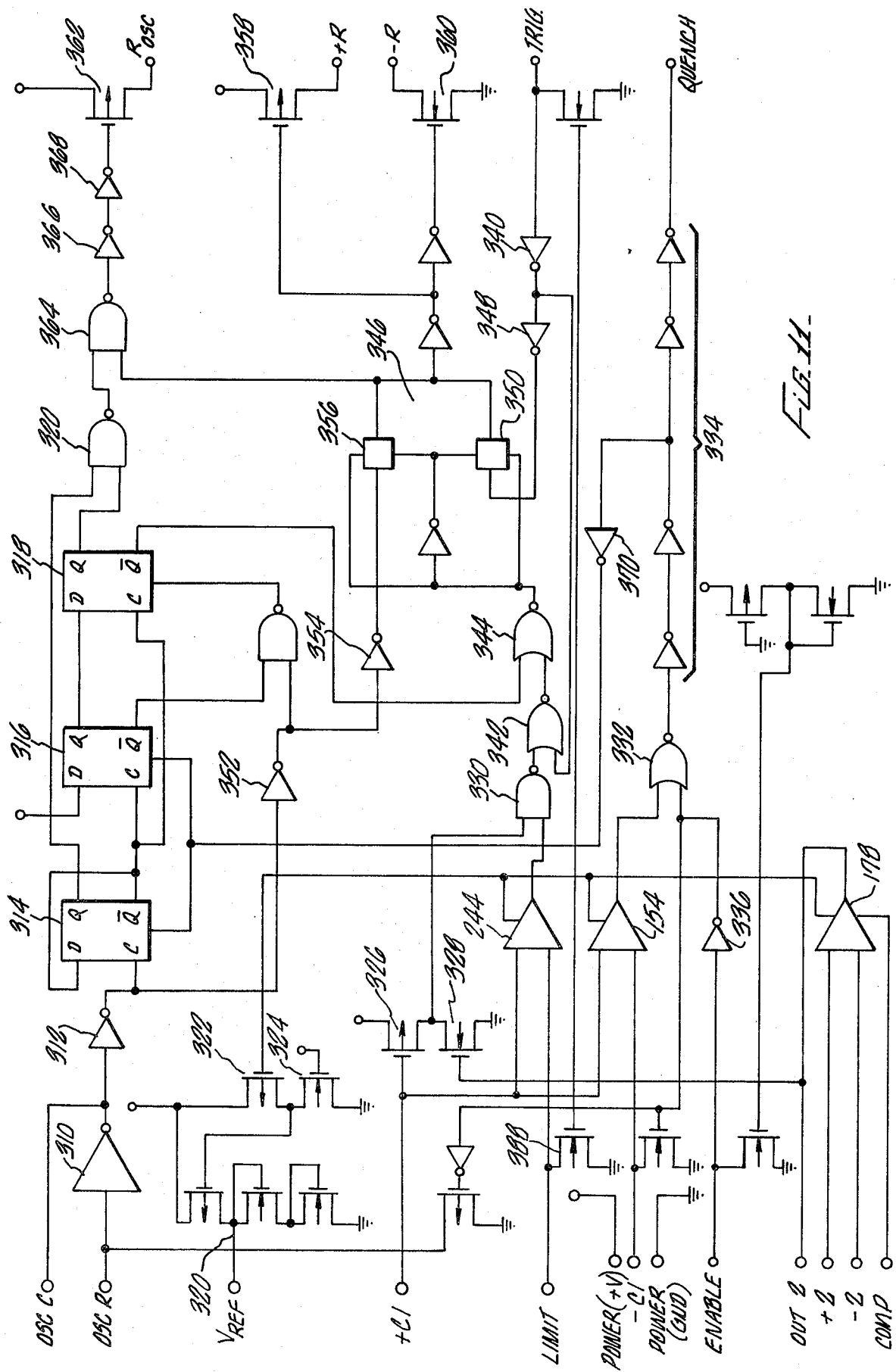

FLASH ADAPATER AND SYSTEM

FIELD OF THE INVENTION

The present invention relates generally to automatic electronic flash units and more particularly to adapters and a flash adapter system for use therewith.

BACKGROUND

Automatic electronic flash units are well known which automatically control the light flash according to light received by the flash unit. Although these flash units greatly simplify flash photography by, for example, eliminating the need to calculate camera aperature according to subject distance, the camera operator must still make certain adjustments to the camera for proper operation. These adjustments generally include shutter speed and aperture settings.

To further simplify flash photography, various "dedicated" electronic flash units have become available which are specifically adapted to cooperate with a given automatic camera. When attached to the camera, such dedicated flash units can perform various functions including setting shutter speed and indicating within the camera viewfinder that the flash unit is ready for operation and, once a flash is completed, indicating that the flash unit light output was sufficient for proper exposure. Moreover, various of the dedicated flash units either generate or respond to special signals which are unique for a particular automaic camera, thus further integrating the dedicated flash unit and the automatic camera.

Despite the availability of dedicated flash units, a considerable number of general purpose automatic electronic flash units have been and continue to be sold. However, the general purpose flash units do not provide the functions of dedicated flash units and thus do not fully utilize the various automatic cameras, making flash photography more difficult.

One adapter which adapts a conventional automatic flash for use with exposure control systems of automatic exposure cameras is disclosed in U.S. patent application Ser. No. 19,297, filed Mar. 12, 1979, now abandoned in favor of continuation application Ser. No. 306,245 filed Sept. 28, 1981 in the same name as the inventor of the present application and assigned to the same assignee of the present application, the disclosure of which is incorporated herein by reference.

Thus, there is a need for an adapter system including a plurality of adapters having substantial common electrical and mechanical components, thus reducing the necessity for individual interface circuits and components. Further, there is a need for an adapter which can adapt a general purpose automatic electronic flash unit to a particular automatic camera which fully utilizes the capabilities of the flash unit and the automatic camera. In this way, existing general purpose flash units can be adapted to fully, yet inexpensively, take advantage of the capabilities of a number of automatic cameras.

SUMMARY

The present invention provides an adapter which in various exemplary embodiments forms a system of adapters which share substantial common mechanical and electronic components yet which inexpensively and fully utilize the capabilities of a plurality of automatic cameras.

Exemplary adapters in accordance therewith include couplers for connecting to a general purpose automatic flash unit and to the "hot shoe" contacts of an automatic camera. Each adapter further includes a photosensor for providing a signal indicative of light received thereby to an adaptive circuit module which provides the majority of electrical functions for the adapter.

Each adapter may further include interface circuitry necessary to accommodate specialized automatic camera signals, although the cost and complexity of the interface circuitry is greatly reduced by use of the adaptive circuit module.

Furthermore, each adapter includes mechanical components which are common to the entire adapter system. An ASA adjustment slide and an aperture adjustment slide can each include attenuators for adjusting the sensitivity of the photosensor, or, in other embodiments, only one of the slides may include the photosensor sensitivity adjustment attenuator. The ASA and aperature adjustment slides are easily accessible from the front of the adapter, thereby aiding the adjustment of the camera. The aperature and ASA adjustment slides may cooperate to easily and inexpensively provide both a calculator and a means for adjusting the sensitivity of the photosensor.

Thus, it is possible to manufacture relatively simple and inexpensive adapters which are capable of adapting general purpose automatic electronic flash units for use with a plurality of automatic cameras.

It is therefore an object of the present invention to provide an adapter for general purpose automatic flash units.

It is another object of the present invention to provide a plurality of adapters for general purpose electronic flash units, each adapter including a substantial number of mechanical and electronic components common to each adapter of the adapter system.

It is a further object of the present invention to provide improved general purpose automatic electronic flash unit adapters which fully yet inexpensively couple the capabilities of a plurality of automatic cameras and flash units.

These and other objects and advantages of the present invention are apparent from the following detailed description and the accompanying drawings.

BRIEF DESCRIPTION OF THE DRAWINGS

FIG. 1 is a perspective view of an exemplary adapter in accordance with the present invention.

FIG. 2a is an exploded view of the adapter of FIG. 1 and FIG. 2b illustrates another version of the face plate of an adapter.

FIG. 3 is a section view of the adapter of FIG. 1.

FIG. 4 is a system block diagram of exemplary flash adapters in accordance with the present invention.

FIG. 5 is a schematic diagram of an exemplary adapter in accordance with the present invention.

FIG. 6 is a block diagram of the adaptive circuit module of FIGS. 4, 5 and 7-10.

FIGS. 7-10 are schematic diagrams of exemplary adapters in accordance with the present invention.

FIG. 11 is a schematic diagram of the adaptive circuit module of FIGS. 4-10.

DETAILED DESCRIPTION

Figure 8:
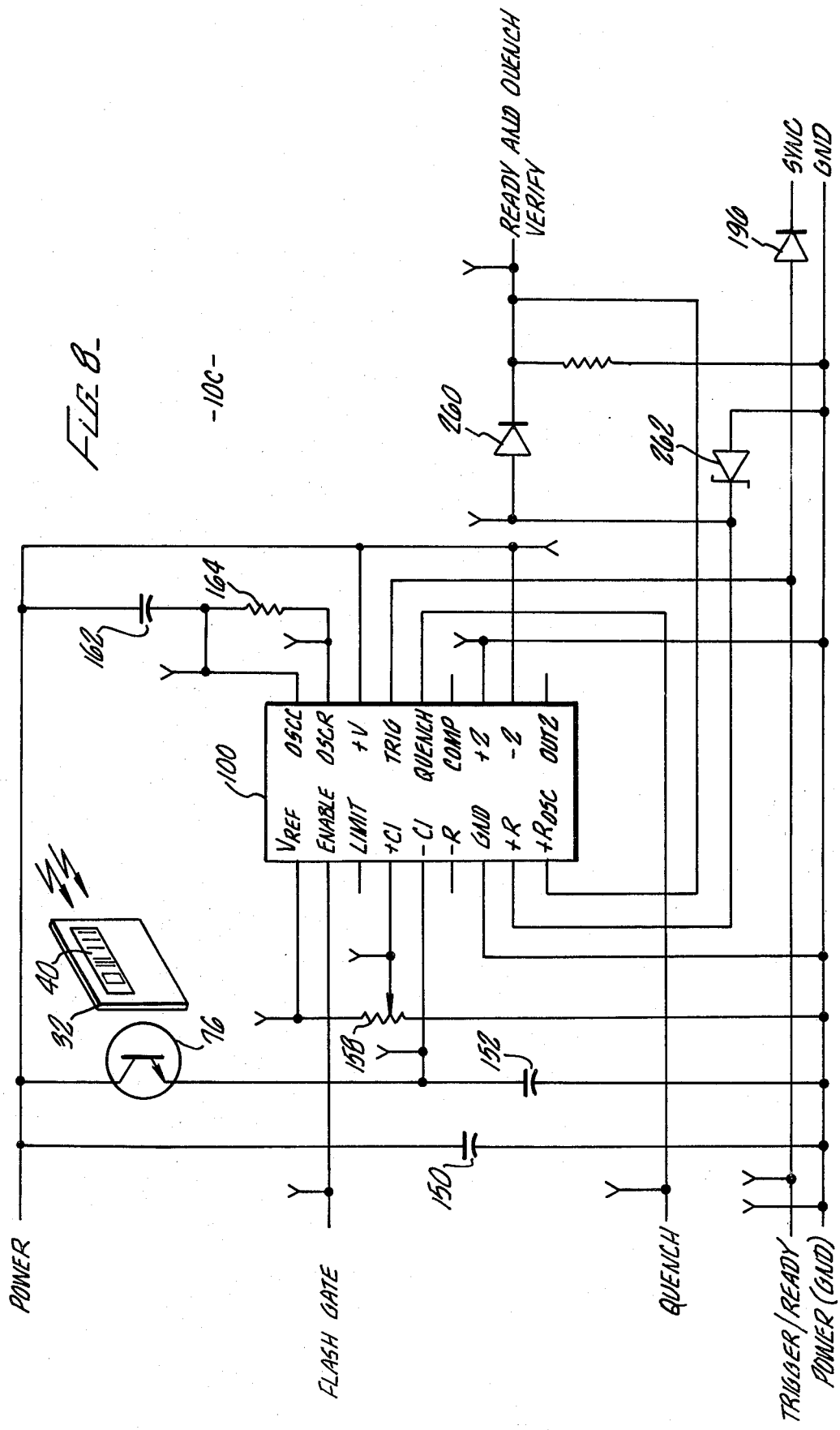

Turning now to FIG. 1, an exemplary adapter 10 in accordance with the present invention includes a housing 12. A front panel 14 includes various indicia and controls operable by the operator as described below. A foot 16 attaches the adapter 10 to a camera (not shown). A receptacle 18 receives a general purpose automatic electronic flash unit 20 to thereby adapt the flash unit 20 to the camera. The flash unit 20 may be, for example, a Vivitar model 2500.

With reference now to FIGS. 2a and 3 which show in greater detail the mechanical features of an adapter in accordance with the present invention, the housing 12 includes a front housing 22 and a rear housing 24. Disposed between the front housing 22 and the rear housing 24 is an inner housing 26. Between the front housing 22 and the inner housing 26 is a face plate 28, a first parameter adjustment slide 30, and a second parameter adjustment slide 32. In the exemplary embodiments of the present invention, the slides 30 and 32 are ASA and camera aperture adjustment slides, respectively. Both the ASA adjustment and aperture adjustment slides 30 and 32 include rectangular openings therein 34 and 36, respectively, which are adapted to retain an ASA attenuator 38 and an aperture attenuator 40, respectively. The ASA and aperture attenuators 38 and 40 adjust the sensitivity of a photosensor as is described below. The attenuators 38 and 40 are variable apertures, and in one embodiment include a plurality of alternating translucent and opaque areas together defining predetermined light transmission capabilities for predetermined positions of the respective attenuators.

The ASA adjustment slide 30 includes a knob 42 that is carried within a slot 44 of the front housing 22. Similarly, the aperture adjustment slide 32 includes a knob 46 which rides within a slot 48 of the front housing 22. The knobs 42 and 46 may be actuated to thereby displace the ASA and aperture adjustment slides 30 and 32. The ASA adjustment slide 30 includes two projections 50 which cooperate with a plurality of serrations 52 at the upper edge of the inner housing 26 to provide a plurality of detent or "click-stop" positions of the ASA adjustment slide 30. In a similar fashion, the aperture adjustment slide 32 includes a projection 54 which co-operates with a plurality of serrations 56 to provide detent positioning of the aperture adjustment slide 32.

The face plate 28 includes suitable indicia such as, for example, an ASA or DIN scale 58 and a camera aperture scale 60. The scales 58 and 60 may be imprinted onto the face plate 28 by any suitable means such as a hot-stamp process. The scales 58 and 60 include a plurality of clear apertures 58a and 60a associated with particular indicia. The ASA and aperture adjustment slides 30 and 32 each include suitably colored dots 62 and 64, respectively, which appear through the apertures 58a and 60a to indicate the position of the slides 30 and 32 and thus the corresponding ASA and aperture settings.

With continued reference to FIGS. 2a and 3, a circuit card 66 and a connector card 68 are affixed to the rear housing 24. The circuit card 66 includes the electrical components for the adapter 10 and the connector card 68 provides a plurality of contacts 70 which engage spring contacts 72 within the flash unit 20. The circuit card 66 and connector card 68 are interconnected by a plurality of conductors 74. The circuit card 66 includes a photosensor 76. Light falling upon the adapter 10 passes through a transparent portion 78 of the face plate 28, through the sensitivity adjustment filters 38 and 40, and finally through an opening 80 within the inner housing 26 to then strike the photosensor 76. As the positions of the ASA and aperture adjustment slides 30 and 32 are varied with the knobs 42 and 46, the sensitivity of the photosensor 76 to light falling upon the adapter 10 is varied by the changing transmission of the associated filters 38 and 40 to thereby adjust the sensitivity of the adapter 10.

The adapter further includes a foot 16 which includes a plurality of spring-loaded contacts 82 and a ground contact 84, contacts 82 and 84 being adapted to interface with corresponding contacts on the automatic camera hot shoe for which the adapter 10 is intended. For example, the adapter of FIG. 2 may be particularly adapted for use with a Canon camera such as the Model AE-1. A lock nut 86 travels on a threaded portion 88 of the foot 16 to secure the adapter 10 to the shoe of the corresponding automatic camera.

It is to be understood that the mechanical components illustrated in FIGS. 2a and 3 are readily adaptable to provide a complete system of adapters that are usable on a number of automaic cameras. For example, the indicia imprinted upon the face plate 28 may be easily varied. In another embodiment of the adapter 10 in accordance with the present invention, the face plate 28 is imprinted as shown in FIG. 2b to provide a rectangular transparent area 90. Additionally, the ASA adjustment slide 30 carries aperture setting number indicia 91, a portion of which is visible through the opening 90. Thus, as the ASA adjustment slide 30 is moved behind the face plate 28 of FIG. 2b, a range of aperature settings is visible through the opening 90 to thereby indicate to the operator of the adapter 10 the aperture or f-stop setting range which may be used for the corresponding film speed. In such an embodiment, the ASA attenuator 38 is not utilized and only the aperature attenuator 40 adjusts the sensitivity of the photosensor 76. Once the ASA adjustment slide 30 is adjusted to a selected ASA thereby indicating the aperature range within the opening 90, the aperature adjustment slide 32 is then moved to a setting corresponding to desired aperture within the range to adjust photosensor 76 sensitivity. In this way, the face plate 28 of FIG. 2b and the ASA and aperature adjustment slides 30 and 32 cooperate to form an exposure calculator which is conveniently located on the front of the adapter 10 and which provides to the operator of the adapter 10 ASA and aperture information that is easily transferred to the automatic camera without having to rotate or revolve the combined flash unit 20, the adapter 10 and the automatic camera (not shown). Moreover, the mechanical components of FIGS. 2 and 3 need only be slightly modified in order to provide this alternative embodiment including, for example, varying the face plate 28 indicia and providing a foot 16 and contacts 82 which are able to engage the shoe contacts of the particular automatic camera. It is to be recognized that such changes are relatively easy and inexpensive to accomplish. Circuitry utilizing these various mechanical configurations is described below with reference to FIGS. 5 and 7-10.

With reference now to the block diagram of FIG. 4, the flash adapter 10 includes an adaptive circuit module 100 which is responsive to a sensor circuit 102. The module 100 provides a ready signal and a quench verify signal to a "hot shoe" 104 of a suitable automatic camera 106. As described hereinbelow, the ready and quench verify signals may be carried by a single line. An interface circuit 108 within the adapter 10 provides an interface between the module 100 and a unique camera signal that may be provided to or from the camera 106.

A sensitivity adjustment mechanism 110 positions at least one filter 40 with respect to the sensor circuit 102 to thereby adjust the sensitivity of the sensor circuit 102 to the light falling upon the flash adapter 10. It is to be understood that the sensitivity adjustment mechanism 110 includes at least one parameter adjustment slide such as the aperature adjustment slide 32 described with respect to FIG. 2a. Moreover, the sensitivity adjustment mechanism 110 can further include a second parameter adjustment slide such as the ASA adjustment slide 30 and a second attenuator 38 as discussed above.

The camera 106 provides through the hot shoe 104 a sync signal to the adapter 10 and in particular to the adaptive circuit module 100 therein. The sync signal is also provided from the adapter 10 as a trigger signal through suitable connector means such as the connector card 68 and spring contact 72 (FIGS. 2a and 3) to a general purpose automatic electronic flash unit such as a flash unit 20 of FIGS. 1 and 3.

The flash unit 20 includes a trigger circuit which receives the trigger signal from the module 10. A battery 112 within the flash unit 20 provides power to a power supply 114 therein and may also provide power to the adapter 10. The adapter 10, however, may include its own internal power source rather than relying upon the battery 112 of the flash unit 20. The power supply 114 provides both low voltage and high voltage power for the flash unit 20. The high voltage power is supplied to a storage capacitor 116 which is connected to a control circuit 118 that is in turn connected to a flash tube reflector assembly 120. A sensor 122 provides a signal to the control circuit 118, this signal being related to the intensity of light falling upon the flash unit 20. The trigger circuit 111 also provides a ready signal via the contacts 72 to the adapter 10 when the storage capacitor 116 is sufficiently charged for proper flash unit 20 operation. In the embodiment shown, the trigger and ready signals are combined in a single trigger/ready line. Also, a flash gate signal is generated by the flash tube reflector assembly 120 indicating that the assembly 120 is generating a light flash. This signal is applied through one of the contacts 72 to the adapter 10. To terminate a light flash, the module 100 within the adapter 10 provides a quench signal to the control circuit 118 of the flash unit 20.

The flash unit 20 is of a conventional design and may be used directly with a camera such as the camera 106 by mounting the flash unit 20 upon the hot shoe 104 of the camera 106. In such an instance, the flash unit 20 is connected to the camera 106 by means of a standard camera connector or shoe 124 which provides a trigger or sync signal to the trigger circuit 111. Although the flash unit 20 provides several signals at the contacts 72, it will be recognized through the following description that the adapter 10 need only apply the trigger signal and the quench signal to the flash unit 20 and need only respond to the ready signal therefrom. Furthermore, the signals may be readily interfaced with a large number of automatic flash units as, for example, by connecting to the flash unit foot trigger line (trigger/ready signals) and the sensor leads (quench signal). In this way, the adpater 10 may be easily modified to cooperate with a number of general purpose automatic electronic flash units.

Turning now to FIG. 5, a simplified schematic diagram of a version of the flash adapter 10 in accordance with the present invention is shown therein. The flash adapter 10a of FIG. 5 is particularly suited for use with Canon automatic cameras including the Canon Model AE-1. A filter capacitor 150 is connected across the power (+V) line and the power (gnd) line from the flash unit 20. The power (+V) and power (gnd) lines comprise the power line as shown in FIG. 4. The collector of the photosensor 76 is connected to the power (+V) line and the emitter thereof is connected to an integrating capacitor 152 and also to a −Cl input of the module 100. As seen in FIG. 6, the −Cl input of the module 100 is an inverting input to a quench comparator 154. The circuitry of the module 100 is described in more detail with reference to FIG. 11. With continued reference to FIG. 5, the other connection to the integrating capacitor 152 is connected to the power (gnd) line of the adapter 10a.

As seen in FIGS. 5 and 6, the $V_{REF}$ output terminal of the module 100 from a voltage reference 156 is connected to one terminal of a resistive element of a sensitivity adjustment potentiometer 158. The other end of the resistive element of the potentiometer 158 is connected to the power (gnd) line. The wiper of the potentiometer 158 is connected to a +Cl input of the module 100 which is applied to a non-inverting input of the quench comparitor 154 therein.

A +V terminal of the module 100 is connected to the power (+V) line and a GND terminal of the module 100 is connected to the power (gnd) line of the adapter 10a.

An OSC C and an OSC R input to the module 100 are each applied to an oscillator 160 therein. The OSC C input is connected to a capacitor 162 and to a resistor 164. The other lead of the resistor 164 is connected to the OSC R input and the other lead of the capacitor 162 is connected to the power (+V) line. The resistor 164 and the capacitor 162 provide an R-C network to establish the frequency of the oscillator 160.

The trigger/ready line from the flash unit 20 (FIGS. 4 and 5) is applied to the TRIG terminal of the module 100. This terminal is connected to a ready detector circuit 166 therein. The output of the ready detector 166 is applied to a current source 168, a current sink 170 and a pulsating current source 172. The current source 168, current sink 170 and pulsating source 172 each have outputs which are applied to the module terminals +R, −R and $+R_{OSC}$, respectively. As seen in FIG. 5, the −R terminal is connected through a current limiting resistor 173 to a flash adapter output line which comprises both the ready and quench verify outputs from the adapter 10a to the camera 106 of FIG. 4. In the embodiment of FIG. 5, the +R and the $+R_{OSC}$ terminals of the module 100 are not connected. The adapter 10a circuitry may include a plurality of test point connections points, such as 175.

The flash gate signal from the flash unit 20 is applied to an ENABLE terminal of the module 100. This terminal is connected to a discharge circuit 174 and is also connected to a quench driver 176. The quench comparator 154 within the module 100 also provides an output to the quench driver 176. The quench driver in response to these inputs generates an output which is applied to the quench terminal of the module 100. This terminal is connected to the quench output of the adapter 10 that is applied to the flash unit 20.

The module 100 includes an auxillary operational amplifier 178 which is connected to three input terminals −2, +2 and COMP. The output of the amplifier 178 is applied to an OUT 2 terminal of the module 100.

Connected between the OUT 2 terminal and the COMP terminal is a compensating capacitor 180.

In the embodiment of FIG. 5, the automatic camera may provide to the adapter 10a a voltage reference signal on a ready and quench verify line 182. Such a reference signal is available with, for example, the Canon model AE-1. This voltage reference signal is applied through a precision voltage divider comprising resistors 184, 186 and 188 to the +2 terminal of the module 100. The output of the amplifier 178 is applied to a selection switch 190, the switching contact of which is selective connected to one terminal of a resistor network 192. The switch 190 is operated by the aperture adjustment slide 32 and is selected to one switch position for each detent position of the aperture adjustment slide 32. The resistor network 192 is then connected to the −2 terminal of the amplifier 178. The resistor network 192 as selected by the switch 190, determines the gain of the amplifier 178 within the module 100. The output of the amplifier 178 is also applied to the unique camera signal line 194 of the adapter 10a which is in turn applied to the camera 106. For an automatic camera such as the Canon model AE-1, this signal adjusts the camera aperture according to the voltage appearing thereon. In an exemplary embodiment, when the voltage appearing on the unique camera signal line 194 is equal to the reference voltage on the line 182, the camera aperture is adjusted to f4. As the voltage on the line 194 increases an increment of 75 millivolts, the camera aperture is increased one stop to a setting of f2.8 while a decrease of 75 millivolts on the line 194 decreases the camera aperture one stop to f5.6.

The camera 106 sync input is connected through an isolation diode 196 to the trigger/ready line of the module 10a.

The operation of the module 10a in cooperation with the flash unit 20 on the camera 106 will now be described. When the flash unit 20 is sufficiently charged to an operating level, the output from the storage capacitor 116 (FIG. 4) as applied to the trigger circuit 111, provides the signal on the trigger/ready line to the adapter 10a. This signal is applied to the TRIG terminal of the module 100 and in turn to the ready detector 166 which, in response to the signal from the flash unit 20, provides an output to the current source 168, the current sink 170 and the pulsating current source 172. The current sink 170 then sinks or draws current through the current limiting resistor 173 from the line 182 to provide a ready signal to the camera 106. The camera 106, in response to the current flow to the adapter 10a, may illuminate an indicator or otherwise indicate within the camera view finder that the flash unit 20 is ready. Further in response to the current flow, the camera 106 adjusts shutter speed for flash photography which may be, for example, 1/60 second.

To adjust the adapter 10a for use, the operator adjusts the positions of the aperture and ASA adjustment slides 32 and 30. As the aperture adjustment slide 32 is adjusted to various apertures as indicated through the face plate of the adapter 10a, the switch 190 is accordingly adjusted to thereby provide from the amplifier 178 a signal to the camera 106 which corresponds to the selected aperture. Moreover, as the aperture adjustment slide 32 is positioned, the filter 40 carried by the slide 32 is moved to thereby vary the sensitivity of the photosensor 76. In the exemplary embodiment of FIG. 5, the filter 40 is optically clear when the aperture adjustment slide 32 is set to a position corresponding to f2.8 and has a density increase of 0.30 for each additional f-stop through f11.

Additionally, as the ASA adjustment slide 30 is moved to indicate the film speed, the attenuator 34 carried by the slide 30 also is positioned to vary the sensitivity of the photosensor 76. In the embodiment of FIG. 5, the attenuator 34 is optically clear when the ASA of the adapter is set to 800 and increases to a density of 1.5 at an ASA of 25 in 0.1 density steps ($\frac{1}{3}$ EV).

It is thus seen that the sensitivity of the photosensor 76 and thus the adapter 10a is varied both with respect to film speed (ASA) and to camera aperture setting. Moreover, this is easily accomplished by use of relatively inexpensive and easily manufactured optical filters rather than expensive and sometimes complicated electronic means. Additionally, the aperture adjustment of the camera is performed by a simple and reliable switch 190 and the associated resistor network 192, controlling the gain of the amplifier 178. Since the amplifier 178 is referenced to the camera reference signal of the line 182, the output from the amplifier 178 is reliably and easily established to thereby control camera aperture.

When the camera operator operates the camera shutter release, a short circuit sync signal appears on the sync line from the camera 106 and is applied through the steering diode 196 to the TRIG terminal of the module 100 and in turn applied to the trigger circuit 111 of the flash unit 20 which causes the flash unit 20 to initiate a light flash. The flash gate signal from the flash unit 20 indicates that the flash unit 20 is producing a light flash. Before the light flash is produced, the discharge circuit 174 of the module 100 holds the integrating capacitor 152 at discharge. However, once the flash begins, the flash gate from the flash unit controls the discharge circuit 154 and thus the integration process begins as current flows through the photosensor 76 in response to light falling thereon.

Once the integration capacitor 152 reaches a charge level which is preset by the sensitivity adjustment potentiometer 158, the quench comparator 154 provides an output to the quench driver 176. The driver 176 in turn generates a quench output to the flash unit 20. This quench signal may be applied to the control circuit 118 to quench the light flash. For example, the quench signal may be applied to override the integration process that would normally occur within the control circuit 118 or may be used to override the operation of a comparator within the control circuit 118 which can be similar to the quench comparitor 154 of the module 100. Thus, although the embodiment of FIGS. 4 and 5 is particularly adapted to provide a quench signal through the contacts 72 to the control circuit 118, it will be clear to those skilled in the art that the quench signal may be applied to leads of the sensor 122 of the flash unit 20. It will be further clear to those skilled in the art that the enable signal from the flash unit 20 can be simulated within the adapter 10a as, for example, in response to the sync signal from the camera. Consequently, where the sensor leads are accessible and the trigger/ready signal is externally available as, for example, with Vivitar Flash Unit Models 283 and 285, the flash unit 20 need not include the contacts 72 as available on the Vivitar Model 2500.

The quench signal from the quench driver 176 is also applied to a three pulse circuit 198 which is also connected to the output of the oscillator 160. The output of the three-pulse circuit 198 is connected to the current source 168, the current sink 170 and the pulsating current source 172. The quench signal from the quench driver 176 enables the three pulse circuit 198 to provide three pulses at a frequency determined by the oscillator 160. In the embodiment of FIG. 5, the current sink 170 provides three pulses through the −R terminal of the module 100 and the current limiter resistor 173 to the line 182 and thus to the camera 106. The oscillations or pulses provided by the current sink 170 indicate to the operator of the camera 106 that the flash unit 20 has been quenched and thus that the flash unit 20 produced sufficient light for proper exposure. The indication within the camera may consist of blinking indicators or movement of an aperture or shutter speed indicating a needle. In this way, the adapter 10a by means of the module 100 indicates to the operator of the camera not only that the flash unit 20 is ready, but also that the flash unit 20 has been properly quenched.

The adapter 10a can also be used with other suitable Canon automatic cameras. Although these cameras do not provide the reference signal and do not respond to the unique camera signal, the operation is otherwise as described above. In these instances, the operator manually adjusts camera aperture according to the position of the aperture adjustment slide 32.

Another version of the adapter 10 in accordance with the present invention is shown in FIG. 7. The adapter 106 of FIG. 7 is particularly suited for use with Nikon automatic cameras including the Model EM. It is to be seen that the adapter 10b of FIG. 7 includes circuitry which is substantially similar to the circuitry of the adapter 10a of FIG. 5 including the module 100 and various components associated therewith. As with the adapter 10a, the adapter 10b includes interface circuitry which allows the adapter 10b to be fully compatible with certain automatic cameras.

Specifically, the adapter 10b includes a current limiting resistor 220 associated with a Zener diode 222 that provides a voltage reference on the line 224 within the adapter 10b. The resistor 220 is in series with the power (+V) line and the diode 222 is connected between the line 224 and the power (gnd) line 226. A unique camera signal from the camera is applied to a line 228 within the adapter 10b. This unique camera signal is provided, for example, by the Nikon Model EM and in the embodiment of FIG. 7 varies with the setting of the camera aperture and film speed. More particularly, with the camera aperture adjusted to f4 and the film speed adjusted to an ASA of 100, the unique camera signal applied to the line 228 is approximately 1.353 volts. This signal then varies approximately 35 millivolts per f-stop according to variations of the camera aperature and film speed adjustment. For example, as ASA is adjusted upwardly, the unique camera signal varies upwardly 35 milivolts per stop. Also, as the camera aperture f-stop adjustment is increased to higher f-stop numbers, the unique camera signal increases at a rate of 35 millivolts per stop.

This unique camera signal on line 228 is applied through a resistor 230 to the base of a transistor 231. The resistor 230 is part of a biasing network comprising resistors 230, 232 and 234 connected between the lines 224 and 226. The collector of the transistor 231 is connected to the +C1 terminal of the module 100 and it is also connected through a resistor 236 to the line 224. The emitter of transistor 231 is connected through a resistor 238 to the line 226 and is also connected to a thermistor 240. The thermistor 240 is connected to the line 224 by a resistor 242.

In the embodiment of FIG. 7, only the aperture adjustment slide 32 includes the attenuator 40 to vary the sensitivity of the photosensor 76. The ASA adjustment slide 30 is not provided with the attenuator 34, thus leaving the opening 34 which does not affect photosensor 76 sensitivity. The aperture adjustment slide 32 is mechanically linked to a switch 243.

The +2 input to the auxiliary operational amplifier 178 within the module 100 is provided from the sensitivity adjustment potentiometer 158. The output from the amplifier 178 is connected to the −2 or inverting input of the amplifier 178, thus forming an impedance-adjusting buffer amplifier which provides an input through the switch 243 to the LIMIT terminal of the module 100. The LIMIT terminal is connected to a lower limit circuit 244. The quench level input to the module 100 at the terminal +C1 is also applied to the lower limit circuit 244 and is also applied to an upper limit circuit 246. The lower and upper limit circuits 244 and 246 detect an out-of-range condition present on the quench level input line at terminal +C1. The lower limit is adjusted by the potentiometer 158, the amplifier 178 and the associated circuitry. The output of the circuits is connected to a blinking out-of-range circuit 248 that provides an output to the current source 168, the current sink 170 and the pulsating current source 172. In the embodiment of FIG. 7, the current source 168 is connected by the terminal +R to the adapter output which provides the ready and quench verify signal to the camera.

The operation of the adapter 10b of FIG. 7 is generally similar to that of the adapter 10a described above. With the adapter 10b suitably connected to a Nikon Model EM, the unique camera signal on the line 228 via the transistor 231 adjusts the quench level or quench threshhold which is applied to the quench comparator 154. It is to be noted that the switch 243 is operated by the aperture adjustment slide 32 and when the slide 32 is in a position designated EM on the front panel 28 of the adapter 10b (EM position not shown in FIGS. 2a and 2b), the switch 243 is closed and the attenuator 40 in that position is optically clear, thereby not substantially decreasing or varying the sensitivity of the photosensor 76. In this way, as the camera aperture and film sensitivity controls are adjusted, the unique camera signal adjusts the quench level of the quench comparator 154 and thus the amount of light produced by the flash unit 20. However, when the aperture adjustment slide 32 is adjusted to other positions indicative of aperture settings as for use with other suitable automatic Nikon cameras, the attenuator 40 varies the sensitivity of the photosensor 76. Moreover, the switch 243 is opened to thereby remove the input from the LIMIT terminal of the module 100, disabling the lower limit function. In this operational mode, the quench threshhold applied to the terminal +C1 is established by the biasing of the transistor Q2 as adjusted through that biasing network by the potentiometer 158.

Turning now to FIG. 8, shown therein is a schematic diagram for an adapter 10c in accordance with the present invention which is particularly adapted for use with automatic cameras such as those manufactured by Minolta. It is seen that the adapter 10c is substantially similar to the adapters described above. In this embodiment, the adapter 10c includes interface circuitry to allow the adapter 10c to operate various camera viewfinder indicators for ready and quench verify indication. The +R terminal of the module 100 is connected through a diode 260 to the ready and quench verify output of the adapter. A Zener diode 262 provides a voltage drop that establishes a first threshold level. When the flash unit 20 is ready for operation, the signal appearing on the trigger/ready line causes the +R terminal to source current through the diode 260. This current source adjusts the automatic camera shutter speed to a speed compatable for flash photography. Note that in the other embodiments described herein, the ready current source or sink similarly adjusts camera shutter speed. Additionally, the $+R_{OSC}$ terminal of the module 100 provides a pulsating current source at a first frequency but at a second threshold level above the threshold level provided by the +R terminal. As seen in FIG. 6, a divide-by-two circuit 264 responsive to the oscillator 160 generates a first frequency signal that is applied to the pulsating current source 172, this signal providing an output from the pulsating current source 172 indicating that the flash unit is ready for operation. This pulsating second level or threshold source operates an indicator within the automatic camera at a first predetermined frequency, indicating to the camera operator that the flash unit 20 is ready for operation.

Once the adapter 10c functions as previously described for the other embodiments described above to provide a quench signal to the flash unit 20, the three-pulse circuit 198 and the pulsating current source 172 together provide a pulsating signal at a second frequency to the camera to thereby indicate quench verification. This pulsating signal passes through both the first threshhold established by the +R terminal and the second threshhold established by the $+R_{OSC}$ terminal of the module 100, thus causing a clear indication within the camera 106 that flash quench has occurred.

Yet another version of the adapter of the adapter system in accordance with the present invention is shown in FIG. 9. An adapter 10d shown therein includes circuitry generally similar to the circuitry described previously. However, the adapter 10d includes interface circuitry adapted to utilize a unique camera signal from an automatic camera such as one or more Pentax automatic cameras. Such a camera provides a unique camera signal output which is applied through the camera adapter 10d foot contacts to a line 282. This signal provides a positive-going level transmission when the camera detects that sufficient light has been received by the camera to properly expose the film during flash photograph. Such a signal is often termed a "TTL Auto" signal. This signal is applied through a differentiator comprising a capacitor 283 and two resistors 284 and 286 to the −2 input of the amplifier 178 of the module 100. In this particular embodiment, the amplifier 178 is operated as an inverting comparator with the +2 input applied to the center of a voltage divider comprising resistors 288 and 290. The output of the amplifier 178 is applied through a second differentiator including a capacitor 292 and the potentiometer 158 to the +C1 input of the quench comparator 154. When used with the Pentax camera model which provides such a "TTL Auto" signal, the aperture adjustment slide 32 is set to a position such that the attenuator 40 blocks light transmission to the photosensor 72. With the sensor blocked, the differentiated signal appearing at the +C1 terminal of the module 100 causes the quench comparitor 154 and the quench driver 176 to operate as previously described, thereby quenching the flash unit 20 flash and providing the blinking quench verification signal to the camera from the +R terminal via a current limiting resistor 294.

When the aperture adjustment slide 32 is adjusted to a position other than corresponding to camera model LX, the adapter 10d operates as previously described to quench the light flash of the flash unit 20 and to provide flash ready and quench verification signals to the camera.

Turning now to FIG. 10, yet another version of a flash adapter 10e is shown therein. This embodiment of the flash adapter 10 in accordance with the present invention includes interface circuitry for operating the flash adapter 10e and the associated flash unit 20 with various models of the Olympus automatic cameras. For these cameras, the polarity of the sync and camera ground signals from the camera are reversed as compared with most other automatic cameras and thus the interface circuitry adapts the adapter 10e accordingly. The sync from the camera is applied through a resistor 300 to an inverting transistor 302. The collector of the transistor 302 is applied to the TRIG terminal of the module 100 and to the trigger/ready line of the adapter 10e. Otherwise, the circuitry of the adapter 10e operates as previously described.

Additionally, for at least one particular model of the Olympus cameras, more specifically the OM2, a unique camera signal from the camera is applied to a line 304. This unique camera signal produces a negative-going signal transition level when the camera determines that sufficient light has been received by the camera during flash photography for proper exposure. As with the camera adapter described with reference to FIG. 9, this signal is often known as a "TTL Auto" signal. This signal is applied through a differentiator comprising a capacitor 306 and the potentiometer 158 to the +C1 terminal of the module 100. Moreover, when the aperture adjustment slide 32 of the adapter 10e is adjusted to a position corresponding to the Olympus Model OM2, the attenuator 40 carried by the slide 32 blocks the photosensor 76. For other Olympus camera models, the aperture adjustment slide is adjusted as previously described to thereby vary the sensitivity of the photosensor 76.

A simplified schematic diagram of the adaptive circuit module 100 is shown with reference to FIG. 11. In an exemplary embodiment, the module is fabricated as a single integrated circuit using CMOS technology. A Schmidt trigger inverting buffer 310 forms the oscillator 160. The output of this buffer 310 is applied through an inverter 312 to a D-type flip flop 314 to form the divide-by-two circuit 264. Two D-type flip flops 316 and 318 are connected in a well-known fashion to provide a shift register.

A plurality of field effect transistors (FETs) 320 provides a voltage reference output at the VREF terminal of the module 100. The reference voltage is established by the FETs 322 and 324.

A P-type FET 326 and an N-type FET 328 together form the upper limit circuit 244, the output of which is connected to an AND gate 330. A lower limit comparator 244 provides a second input to the gate 330, the output of which is described below. The quench comparator 154 provides an output to a NOR gate 332 and through a plurality of buffers 334 to the QUENCH terminal. The ENABLE input is provided through an inverter 336 which drives a FET 338 to hold the −C1 terminal substantially to ground and to enable the QUENCH output via the gate 332 only when the ENABLE signal is present.

The trigger/ready signal from the flash unit 20 is applied through the TRIG terminal of the module 100 and through an inverter 340 to one terminal of a NOR gate 342. The other input of the gate 342 is provided by the gate 330. The output of the gate 342 is applied to a NOR gate 344, the output of which is applied to a data select circuit 346. An inverter 348 connected to the inverter 340 applies an input to a first transmission gate 350 of the circuit 346 while three NAND gates 312, 352 and 354 provide a signal to a second transmission gate 356. This master clock signal is at the oscillator 310 frequency. If the trigger/ready signal indicates that the flash unit 20 is not ready or if either the FETs 326 and 328 or the comparator 244 indicate that the signals at the +C1 terminal is above the upper limit or below the lower limit, then the gates 330, 342 and 344 cooperate to select the main clock signal from the inverter 354 through the data select circuit 346. This causes the current source FET 358, the current sink FET 360 and the pulsating current source FET 362 to provide pulsating signals at the output thereof, which are applied to the camera viewfinder to indicate that an inoperative condition exists. However, once the ready signal from the flash unit 20 is applied along the trigger/ready input to the TRIG input and when the input at the +C1 terminal is within the preset limits, the data selector circuit 346 applies a continuous signal to the FETs 358, 360 and 362 to thereby provide a continuous current source or sink as necessary, to the camera to indicate that the flash unit 20 is ready.

It will be recalled that the adapter 10c of FIG. 8 provides a first pulsating output at a first frequency to the camera to indicate that the flash unit 20 is ready. This signal is provided by the gate 320 and the divide-by-two flip flop 314 which is applied through a NAND gate 364 and two inverters 366 and 368 to the FET 362.

Once the quench signal is generated by the comparitor 154 and the associated gates, the quench signal is applied through an inverter 370 to reset the flip flops 314 and 316. Thereafter, the flip flops 314, 316 and 318 cooperate with the gate 344 to provide a main clock frequency output from the date select circuit 346 to thereby provide a three-pulse output via the FETS 358, 360 and 362. It is to be noted that this three-pulse output is twice the frequency of the low-frequency signal from the gate 320. Thus, for the adapter 10c of FIG. 8, a first low-frequency signal indicates that the flash unit 20 is ready and a second high-frequency signal verifies quench. This same quench verify signal frequency is used by each of the adapters 10a–10e.

From the foregoing, it is apparent that the exemplary adapters of the present invention comprise an adapter system which utilizes substantial common mechanical and electrical components, thereby reducing the cost of each adapter. However, the adapters respond to or generate unique camera signals which take full advantage of the various automatic cameras. In this way, the adapters and the adapter system of the present invention economically and practically adapt general purpose automatic electronic flash units for use as dedicated flash units for particular automatic cameras.

Having described several embodiments of the present invention, it is to be appreciated that the embodiments are exemplary only and are not to limit the scope of the present invention which is to be determined in accordance with the appended claims.

What is claimed:

1. An adapter for use with an automatic electronic flash unit and a camera wherein the flash unit is of the type that includes flash means for providing a light flash, control means for controlling the duration of the light flash in accordance with light normally received by a light sensor of the flash unit or camera, and trigger means for providing a flash unit ready signal and for responding to a synchronizing signal to start the light flash by the flash means, and wherein the camera includes first means for controlling shutter speed and providing an indication to the camera operator in response to a ready indication signal and second means for providing a synchronizing signal substantially synchronized with shutter release, the adapter comprising housing means physically and electrically connectable between a flash unit and a camera, the housing means including
  (a) first electrical terminal means for coupling the flash unit ready signal to the adapter,
  (b) adaptive circuit means in the housing responsive to the flash unit ready signal for generating the ready indication signal,
  (c) second electrical terminal means for coupling the ready indication signal to the camera,
light sensor circuit means for providing a light signal to the adaptive circuit means indicative of the light received by the subject being photographed, said adaptive circuit means generating a quench signal and varying the ready indication signal at least in part in response to the light signal, and
the first means being additionally for coupling the quench signal to control means of the flash unit for terminating the light flash.

2. An adapter as in claim 1 wherein the camera further provides a reference signal and is further responsive to an aperture adjustment signal related to the reference signal for adjusting the camera aperture, the adaptive circuit means further including amplifier means and the adapter further including adjustment means for adjusting the gain of the amplifier means, the amplifier means being responsive to the reference signal for generating the aperture adjustment signal according to the gain adjustment means, the second means being further for coupling the reference signal and the aperture adjustment signal between the adapter and the camera.

3. An adapter as in claim 1 wherein the camera includes means for generating a camera signal related to camera aperture and film speed, the adaptive circuit means being responsive to the camera signal for comparing the light signal with the camera signal and for generating the quench signal and varying the ready indication signal when the light signal and the camera signal reach a predetermined relationship, the second means being further for coupling the camera signal from the camera to the adapter.

4. An adapter as in claim 1 wherein the camera includes means for generating a camera signal indicating that sufficient light has been received by the camera for proper exposure, the adaptive circuit means being responsive to the camera signal for generating the quench signal and varying the ready indication signal, the second means being further for coupling the camera signal to the adapter.

5. An adapter as in claim 1 wherein the adapter housing further includes a faceplate at the exterior of the housing and having thereon at least film speed indicia, and the housing having first and second slides carried by the housing, the first and second slides being disposed between the faceplate and photosensor means in the housing, and the slides being movable with respect to the housing, each slide including means accessible from the exterior of the housing for moving the respective slide and means for indicating the position of the slide with respect to the housing, the adapter including camera aperture indicia, one of said slides being movable to positions defined by the camera aperture indicia and including attenuator means movable therewith for varying the light reaching the photosensor means.

6. An adapter as in claim 5 wherein the remaining one of the slides is movable to positions defined by the film speed indicia, the camera aperture indicia being movable therewith.

7. An adapter as in claim 5 wherein the remaining one of the slides is movable to positions defined by the film speed indicia, the remaining one of the slides including second attenuator means movable therewith for further varying the light reaching the photosensor means in accordance with the position of the remaining one of the slides.

8. An adapter for use with an automatic electronic flash unit and a camera wherein the flash unit is of the type that includes flash means for providing a light flash, control means for controlling the duration of the light flash in response to the light normally received by a light sensor, and trigger means for providing a flash unit ready signal and for responding to a synchronizing signal to start the light flash by the flash means, the camera including first means for controlling shutter speed and for providing an indication to the camera operator in response to a ready indication signal, second means for providing a synchronizing signal substantially synchronized with shutter release, means for providing a reference signal and means responsive to an aperture adjustment signal related to the reference signal for adjusting the camera aperture, the adapter comprising a housing physically and electrically connectable between a flash unit and a camera, first and second slides carried by the housing, the first and second slides being disposed between a photosensor means within the housing and an exterior opening of the housing, means accessible from the exterior of the housing for moving the slides, camera aperture indicia, one of said slides being movable to positions defined by said camera aperture indicia and including attenuator means movable therewith for varying the light reaching the photosensor means, film speed indicia, the remaining one of the slides being movable to positions defined by the film speed indicia and including attenuator means movable therewith for also varying the light reaching the photosensor means, first terminal means carried by the housing for coupling the flash unit ready signal to the adapter, adaptive circuit means in the housing responsive to the flash unit ready signal for generating the ready indication signal, second terminal means carried by the housing for coupling the ready indication signal to the camera, the adaptive circuit means receiving from said photosensor means a light signal indicative of light received by the photosensor means, the adaptive circuit means generating a quench signal and varying the ready indication signal at least in part in response to the light signal, the first terminal means additionally being for coupling the quench signal to the control means of the flash means, the control means being responsive to the quench signal to terminate the light flash, the adaptive circuit means further including amplifier means, gain adjustment means for adjusting the gain of the amplifier means, the amplifier means being responsive to the reference signal for generating the aperture adjustment signal according to the gain adjustment means, one of said slides varying the gain adjustment means in accordance with the position thereof, and the second terminal means being further for coupling the reference signal and the aperture adjustment signal between the adapter and the camera.

9. An adapter for use with an automatic electronic flash unit and a camera wherein the flash unit is of the type that includes flash means for providing a light flash, control means for controlling the duration of the light flash in accordance with light normally received by a light sensor, and trigger means for providing a flash unit ready signal and for responding to a synchronizing signal to start the light flash by the flash means, the camera including first means for controlling shutter speed and for providing an indication to the camera operator in response to a ready indication signal and second means for providing a synchronizing signal substantially synchronized with shutter release, the adapter comprising a housing physically and electrically connectable between a flash unit and a camera, a first slide carried by the housing, a second slide carried by the housing, the first and second slides being disposed between photosensor means and an exterior opening of the housing and being movable with respect to the housing, a faceplate disposed at the exterior opening and having thereon at least film speed indicia, each slide including means externally accessible to the adapter for moving the respective slides with respect to the housing, and indicator means for indicating the position of at least one slide with respect to the housing, said indicator means being observable through said faceplate to indicate a selected film speed thereon, camera aperture indicia observable from the exterior of the housing, one of said slides being movable to positions defined by camera aperture indicia and including attenuator means movable therewith for varying the light received by the photosensor means, first terminal means carried by the housing for coupling the flash unit ready signal to the adapter, adaptive circuit means in the housing and responsive to the flash unit ready signal for generating the ready indication signal, second terminal means carried by the housing for coupling the ready indication signal to the camera, light sensor circuit means for providing a light signal to the adaptive circuit means indicative of the light received by the photosensor means, said adaptive circuit means generating a quench signal and varying the ready indication signal at least in part in response to the light signal, and the first means being additionally for coupling the quench signal to the control means for terminating the light flash.

10. An adapter as in claim 9 wherein the remaining one of the slides is movable to positions defined by the film speed indicia, the camera aperture indicia being on and movable with the remaining one of the slides.

11. An adapter as in claim 9 wherein the remaining one of the slides is movable to positions defined by the film speed indicia, the remaining one of the slides including second attenuator means movable therewith for further varying the light reaching the photosensor means in accordance with the position of the remaining one of the slides.

12. An adapter for use with an automatic electronic flash unit and a camera wherein the flash unit is of the type that includes a flash unit for providing a light flash, control means for controlling the duration of the light flash in accordance with light normally received by a light sensor, and trigger means for providing a flash unit ready signal and for responding to a synchronizing signal to start the light flash by the flash unit, and wherein the camera includes first means for controlling shutter speed and for providing an indication to the camera operator in response to a ready indication signal and second means for providing a synchronizing signal substantially synchronized with shutter release, the adapter comprising a housing physically and electrically connectable between a flash unit and a camera, first terminal means in the housing for coupling the flash unit ready signal to the adapter, adaptive circuit means in the housing responsive to the flash unit ready signal for generating the ready indication signal, second terminal in the housing for coupling the ready indication signal to the camera, sensor circuit means in the housing connected to the adaptive circuit means for providing a light signal to the adaptive circuit means indicative that sufficient light for taking a picture has been received at the subject being photographed, said adaptive circuit means generating a quench signal and providing in response thereto a quench indication signal to generate a visual indiation that quench occurs, and the first terminal means being additionally for coupling the quench signal to control means of a flash unit for terminating a light flash from the flash unit.

13. An adaptive circuit for use in adapter that adapts an automatic electronic flash unit for use with a plurality of automatic cameras wherein the flash unit is of the type that includes flash means for providing a light flash, control means for controlling the duration of the light flash in accordance with light normally received by a light sensor, and trigger means for providing a flash unit ready signal and for responding to a synchronizing signal to start the light flash by the flash means, and each of the plurality of cameras includes first means for controlling shutter speed and for providing an indication to the camera operator in response to a ready indication signal and second means for providing a synchronizing signal substantially synchronized with shutter release, the adapter including photosensor means for providing a light signal indicative of the light received by the photosensor means, the adaptive circuit including:

ready detector means adapted to be responsive to the flash unit ready signal, current source means responsive to the ready detector means for providing a current source and thereby providing the ready indication signal to ones of the automatic cameras, current sink means responsive to the ready detector means for providing a current sink and thereby providing the ready indication signal to ones of the automatic cameras, pulsating current means responsive to the ready detector means for providing pulsating current in response to the ready detector means for thereby providing the ready indication signal to at least one of the automatic cameras, quench comparative means for providing a quench signal at least in part response to the light signal, and counting circuit means for applying a signal to the current source means, current sink means and to the pulsating current means for varying the output thereof in response to the quench signal to thereby vary the ready indication signal to provide an indication of flash unit quench.

14. An improved calculator of an electronic flash unit adapter wherein the adapter includes a housing and photosensor means responsive to light received by the adapter, the calculator comprising a faceplate which bears film speed indicia, the faceplate defining an exterior opening of the housing, a first slide carried by the housing, a second slide carried by the housing, the first and second slides being disposed between the photosensor means and the exterior opening of the housing and including means accessible from the exterior of the housing for moving the slides, camera aperture indicia carried by the calculator, one of the slides being movable to positions defined by the camera aperture indicia and including attenuator means movable therewith for varying the light reaching the photosensor means, and the remaining one of the slides being movable to positions defined by the film speed indicia, the camera aperture indicia being movable with the remaining one of the slides.

15. An improved calculator of an electronic flash unit adapter wherein the adapter includes a housing and photosensor means responsive to light received by the adapter, the calculator comprising a faceplate which carries film speed indicia and camera aperture indicia, the faceplate defining an exterior opening of the housing, a first slide carried by the housing, a second slide carried by the housing, the first and second slides being disposed between the photosensor means and the exterior opening of the housing and including means accessible from the exterior of the housing for moving the slides, one of the slides being movable to positions defined by the camera aperture indicia and including attenuator means movable therewith for varying the light reaching the photosensor means, and the remaining one of the slides being movable to positions defined by the film speed indicia, the remaining one of the slides including second attenuator means movable therewith for further varying the light reaching the photosensor means in accordance with the position of the remaining one of the slides.

16. An improved calculator for an electronic flash unit adapter wherein the adapter includes a housing and photosensor means responsive to light received by the adapter, the calculator comprising
a faceplate defining an exterior opening of the housing and having film speed and camera aperture indicia thereon,
first and second slides carried by the housing,
the first and second slides having apertures therein and being disposed between the photosensor means and the exterior opening of the housing, the slides including means accessible from the exterior of the housing for moving the slides,
a first one of the slides being movable to positions defined by the camera aperture indicia and including attenuator means movable therewith for varying the light reaching the photosensor means, and
the second one of the slides being movable to positions defined by the film speed indicia and including attenuator means movable therewith for varying the light reaching the photosensor means.

17. An improved electronic flash unit calculator including a housing and photosensor means responsive to light received by the unit, the calculator comprising
a faceplate carried by the housing, the faceplate containing indicia at least indicative of film speed or camera indicia,
first and second relatively movable slides carried by the housing, each slide including marker indicia viewable through said faceplate,
the first and second slides having apertures therein and being disposed between the photosensor means and an exterior opening of the housing, the slides including means accessible from the exterior of the housing for moving the slides, and
camera aperture indicia and film speed indicia carried by the calculator, the first of said slides being movable to positions defined by the camera aperture indicia and including light attenuator means movable therewith for varying the light reaching the photosensor means, the second slide being movable to positions defined by film speed.

18. An improved electronic flash unit calculator including a housing and photosensor means responsive to light received by the unit, the calculator comprising
a faceplate carried by the housing at an exterior opening thereof, the faceplate containing indicia indicative of film speed or a camera parameter,
at least one movable slide carried by the housing and movable with respect to the housing, said slide including a marker viewable through said faceplate to indicate a selected indicia on the faceplate,
the movable slide having an aperture therein and being disposed between the photosensor means and the exterior opening of the housing, the slide including means accessible from the exterior of the housing for moving the slide with respect to the housing and the faceplate, and
the slide being movable to positions defined by either camera aperture parameter or film speed and the slide including light attenuator means in the aperture thereof and movable with the slide for varying the light reaching the photosensor means.

* * * * *